Aug. 27, 1963 R. C. MERCER, SR 3,101,812
CLAMP-ON LUBRICATING APPLIANCE
Filed Aug. 25, 1961
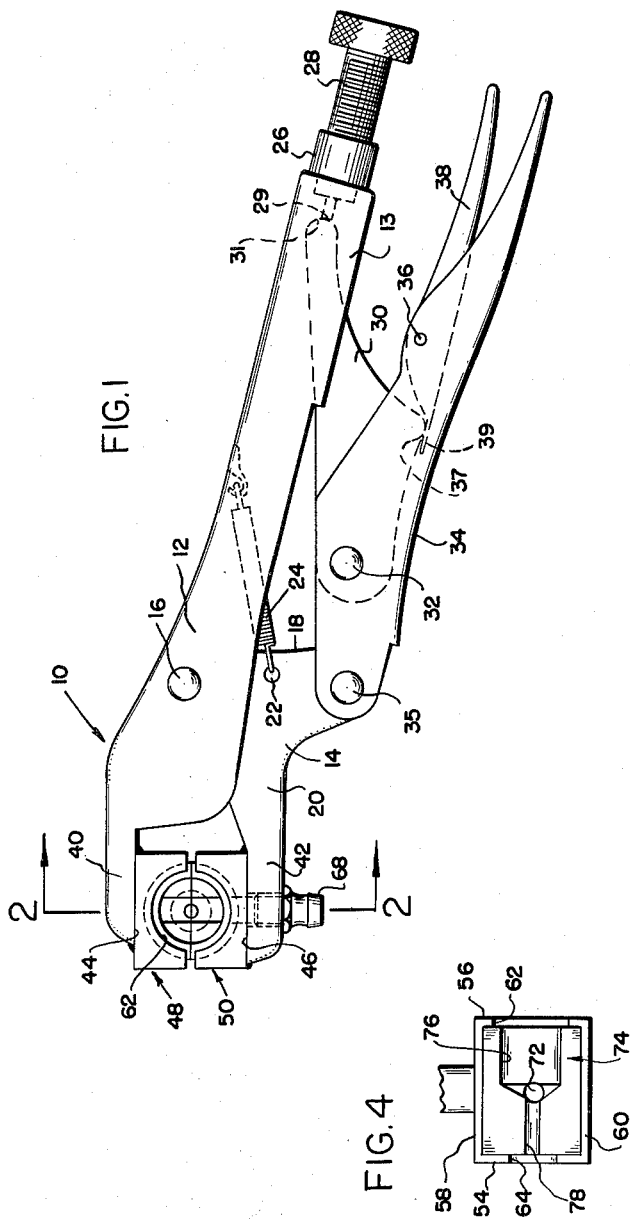
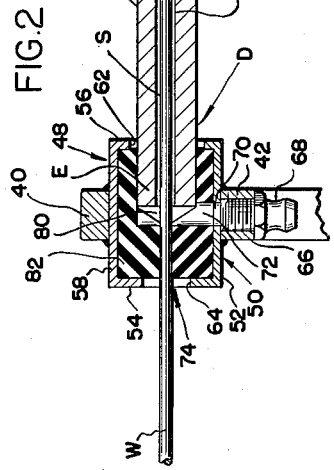
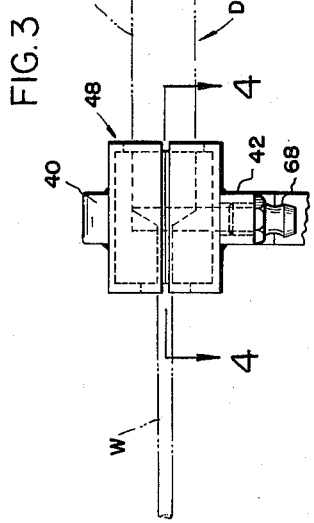
INVENTOR.
ROY C. MERCER, SR.
BY
Barthel & Bugbee
ATTORNEYS

United States Patent Office 3,101,812
Patented Aug. 27, 1963

3,101,812
CLAMP-ON LUBRICATING APPLIANCE
Roy C. Mercer, Sr., 276 Emmons Blvd.,
Wyandotte, Mich.
Filed Aug. 25, 1961, Ser. No. 136,140
7 Claims. (Cl. 184—105)

This invention relates to lubricating appliances and, in particular, to such appliances for lubricating wire-in-conduit motion-transmitting devices.

One object of this invention is to provide a lubricating appliance which can be quickly and easily applied to the end of a conduit in which a motion-transmitting member, such as a rod or wire, is movably mounted, the appliance being provided with means for forcibly introducing a lubricant into the space between the wire and the conduit.

Another object is to provide a lubricating appliance as set forth in the preceding object, wherein the appliance is provided with a pair of jaws which move into and out of engagement with one another to permit their application to the end of the conduit and around the motion-transmitting member, means being provided for injecting the lubricant through or adjacent at least one of the jaws.

Another object is to provide a lubricating appliance as set forth in the preceding objects wherein the jaws are attached to a pair of arms, preferably in the form of pliers or tongs, for facilitating their rapid separation and engagement.

Another object is to provide a lubricating appliance of the foregoing character wherein the jaws contain elastic deformable liners adapted to seal the junction between the jaws themselves and also between the jaws and the conduit, as well as between the jaws and the motion-transmitting member.

Another object is to provide a lubricating appliance of the foregoing character wherein the jaw liners are configured as adapters and provided in sets to fit varying sizes and shapes of conduits and motion-transmitting members, so that the proper pair of liners can be inserted in the jaws to fit a particular motion-transmitting device, interchangeably with differently-shaped or differently-sized liners adapted to fit other and different motion-transmitting devices.

Other objects and advantages of the invention will become apparent during the course of the following description of the accompanying drawing, wherein:

FIGURE 1 is a side elevation of a lubricating appliance, according to one form of the invention, with the jaws in their closed positions and showing the motion-transmitting device in position to be lubricated;

FIGURE 2 is a vertical section taken along the line 2—2 in FIGURE 1.

FIGURE 3 is a fragmentary left-hand or front elevation of the lubricating appliance shown in FIGURES 1 and 2, with the motion-transmitting device being lubricated shown in dotted lines; and FIGURE 4 is a horizontal section taken along the line 4—4 in FIGURE 3, showing the lower jaw, liner and lower arm portion in top plan view with the motion-transmitting device absent.

Hitherto, great difficulty has been experienced in the lubrication of motion-transmitting devices of the wire-in-conduit type, one form of which is known a Bowden wire motion-transmitting device, due to the inconvenient location, limited space and restricted lubricant opening in such devices, especially those used for operating parking or emergency brakes in motor vehicles, such brakes being also known as hand brakes. The great need for lubricating such motion-transmitting devices is amplified by the operation of such motor vehicles in winter upon ice or snow-covered streets which have been treated with salt or other corrosive chemicals to melt the snow or ice. Such chemicals, being highly corrosive, attack the metal of the conduit and motion-transmitting wire or cable, eventually resulting in sticking and jamming to such an extent as to render the hand brake inoperative from the driver's seat, with consequent danger to life. The present invention provides a lubricating appliance by which a lubricant, such as grease, can be quickly and easily injected into the restricted clearance space between the motion-transmitting member and the conduit, so as to coat the motion-transmitting member with a protective layer of lubricant which not only provides for easier motion of the motion-transmitting member with the application of less force, but also provides a protective coating for excluding corrosive chemicals splashed onto the motion-transmitting member.

Referring to the drawings in detail, FIGURE 1 shows a lubricating appliance, generally designated 10, according to one form of the invention as including a pair of upper and lower jaw-carrying arms 12 and 14 pivoted to one another as at the pivot pin 16. The upper arm 12 is preferably formed from a sheet metal stamping of U-shaped or channel-shaped cross-section, with a three-quater-round rearward portion 13 leaving a narrow slot at the bottom. The lower arm 14 is in the form of a bellcrank lever stamped from a solid plate with a rearward portion 18 disposed substantially at right angles to the forward portion 20 and provided with a hole 22. Attached to the hole 22 is the forward end of a tension spring 24, the rearward end of which is anchored to a hook or eye 25 welded within the midportion of the upper arm 12.

The rearward end of the upper arm 12 is provided with a tubular internally-threaded portion or collar 26 through which is threaded a knurled-headed adjusting screw 28, the inner or forward end 29 of which engages the rearward end 31 of a triangular link 30, the forward end 33 of which is drilled to receive a pivot pin 32 mounted on a handle lever 34 of U-shaped or channel cross-section. The forward end of the handle lever 34 and the lower end of the rearward portion 18 of the bellcrank lever or lower arm 14 are drilled in alignment with one another to receive a pivot pin 35. The triangular link 30 exerts a toggle action to lock the upper and lower arms 12 and 14 together, as explained below. The handle lever 34 is drilled rearward of the pivot pin 32 to receive a pivot pin 36 upon which is pivotally mounted a lock-releasing lever 38, the forward end 37 of which engages the apex 39 of the triangular link 30. The lever 38 when shifted to push the apex 39 of the triangular link 30 upward unlocks the locking mechanism by which the forward end portions 40 and 42 of the upper and lower arms 12 and 14 respectively are locked in position. The above-described toggle latching mechanism is conventional and known to those skilled in the art of wrenches and hand tools, being described in the Peterson Patent 2,280,005 of April 14, 1942 and in the Jones Patent 2,514,130 of July 4, 1950.

The forward end portions 40 and 42 of the arms 12 and 14 respectively are cut away to form cutaway portions or surfaces 44 and 46. Welded or otherwise secured to the flat surfaces 44 and 46 of the forward end portions 40 and 42 are upper and lower lubricating jaws 48 and 50 respectively, each of which is of an open box shape with a bottom wall 52, opposite end walls 54 and 56, and front and rear side walls 58 and 60. The two jaws 48 and 50 are of generally similar construction with large and small semi-circular notches or grooves 62 and 64 respectively in their opposite ends 56 and 54 for the passage of the conduit C and motion-transmitting member or wire W respectively (FIGURE 2). When the two jaws 48 and 50 are in their closed positions shown in FIGURES 1, 2 and 3, the semi-circular notches or grooves 62 and 64 facing one another become, in effect, fully circular holes.

The forward portion 42 of the lower arm 14 is drilled and threaded as at 66 to receive the correspondingly-threaded shank of a conventional tubular lubricant fitting 68. The latter is adapted to be engaged by the conventional coupling of a pressure lubricant injecting device, such as a so-called grease gun (not shown). Such grease guns and the like are conventional, well-known to the lubricating art, and their details form no part of the present invention. The lubricant fitting 68 at its inner end is aligned with a hole 70 in the bottom wall 52 of the lower jaw 50, which in turn opens into a vertical passageway 72 in a resilient lower liner, sealing member or adapter 74 of the elastic deformable material having large and small bores 76 and 78 respectively (FIGURE 4) configured to snugly fit and sealingly engage the conduit C and motion-transmitting member W of the motion-transmitting device D. The passageway 72 opens into an end chamber 80 which lies between and interconnects the large and small bores 76 and 78 respectively. The resilient upper liner, sealing member or adapter 82 is also of elastic deformable material and similar in construction to the lower liner 74 except that it lacks the passageway 72, because the upper jaw 48 lacks the lubricating fitting 68.

In the operation of the invention, let it be assumed that a wire-in-conduit motion-transmitting device D (FIGURES 2 and 3) is to be lubricated by the application of grease or the like from a standard pressure-lubricating gun having a coupling (not shown) adapted to be releasably connected to the lubricant fitting 68 in the well-known manner known to those skilled in the art of using such pressure-lubricating guns. The motion-transmitting device, for example, may consist of a hand brake operating means located beneath the floor boards of an automobile adjacent the frame in a restricted location where an ordinary lubricating device, such as an oil can, would not properly inject lubricant into the very limited clearance space between the motion-transmitting wire W and the conduit C, which is ordinarily a flexible metal hose.

Accordingly, the operator depresses the lock-releasing lever 38 (FIGURE 1) to push upward the apex 37 of the triangular link 30 so as to release the toggle mechanism which clamps the lubricating jaws 48 and 50 together, whereupon he swings the upper and lower arms 12 and 14 and the jaws 48 and 50 mounted thereon apart from one another and pushes the separated jaws 48 and 50 over opposite sides of the end E of the conduit C, causing the end E to be sealingly gripped in the socket or large bore 76 and the wire W to be sealingly gripped in the small bore 78 of the upper and lower liners or adapters 82 and 74. The operator then screws the adjusting screw 28 inward or outward to swing the triangular link 30 around its pivot pin 32 so as to adjust the lubricating jaws 48 and 50 approximately to the proper separations with the upper arm 12 and lower arm 14 and handle lever 34 slightly open. When this has been done, the operator squeezes the upper arm 12 and lower handle lever 34 between the palm and fingers of his hand, whereupon the jaws 48 and 50 are snapped into a locked position by the operation of the toggle locking mechanism including the triangular link 30. He then operates the lubricating gun in the usual manner to force the lubricating grease or other suitable lubricant through the lubricating fitting 68 and bore 72 into the chamber 80 (FIGURE 2), and thence into the clearance space S between the motion-transmitting member W and its conduit C. In this way, a protective layer of lubricant can be forced through the conduit C not only for lubricating the motion-transmitting member W for easy motion relatively to the conduit C but also for coating its metallic surface and that of the bore B in the conduit C with a protective layer of lubricant which inhibits corrosion from the action of salt or other corrosive materials used upon streets and highways for melting snow and ice in the wintertime. The lubricant thus injected also aids in excluding dust or other foreign matter from the clearance space S in the bore B.

When lubrication has been completed by means of the lubricant gun, as usually indicated by the appearance of grease at the opposite end of the conduit C from the end E to which the appliance 10 has been attached, the operator again depresses the lock-releasing lever 38 by pushing it toward the handle lever 34 with one finger. This again tilts the triangular link 30 around its pivot pin 32 unlocking the toggle latching mechanism so that the upper arm 12 flies away from the lower arm 14 and handle lever 34, impelled by the force of the tension spring 24 acting upon the bellcrank lower arm 14.

What I claim is:

1. A clamp-on lubricating appliance for detachably connecting a pressure lubricating apparatus to one end of the conduit of a wire-in-conduit motion-transmitting device, said appliance comprising a pair of relatively movable jaw carrying arms pivotally connected to one another intermediate their opposite ends for motion of said ends toward and away from one another, a pair of conduit-gripping jaw structures attached to said jaw carrying arms at one end of the appliance, each jaw structure having a recess with a wall sealingly engageable with the conduit end of the motion-transmitting device and also with the motion-transmitting member thereof, one of said jaw structures having a pressure-lubricating fitting thereon adapted to receive a lubricant coupling of the pressure lubricating apparatus, said one jaw structure having a lubricant passageway connecting said fitting to said recess.

2. A clamp-on lubricating appliance, according to claim 1, wherein one of said jaw structures has a resilient sealing member mounted thereon and containing said recess.

3. A clamp-on lubricating appliance, according to claim 2, wherein one of said jaw structures has a cavity therein and wherein said sealing member is removably mounted in said cavity.

4. A clamp-on lubricating appliance, according to claim 1, wherein both of said jaw structures have resilient sealing members mounted thereon, each containing said recess.

5. A clamp-on lubricating appliance, according to claim 4, wherein each of said jaw structures has a cavity therein and wherein each sealing member is removably mounted in its respective cavity.

6. A clamp-on lubricating appliance, according to claim 1, wherein the recess in each jaw structure is configured for the reception of the conduit and motion-transmitting member therein respectively.

7. A clamp-on lubricating appliance, according to claim 1, wherein the recesses in said jaw structures are semi-circular grooves therein facing one another and cooperating with one another to form bores therethrough for the reception and passage of the conduit and motion-transmitting member.

References Cited in the file of this patent
UNITED STATES PATENTS 2,712,862    Pemberton _____ July 12, 1955

FOREIGN PATENTS 257,514    Switzerland _____ Apr. 1, 1949